INVENTORS
EDWARD J. SEDLOCK
CHARLES F. PAQUETTE
HENRY J. SELFORS

BY Fishman + Van Kirk
ATTORNEYS

United States Patent Office 3,471,727
Patented Oct. 7, 1969

3,471,727
SELF-COOLED ELECTRICAL MACHINES
Edward J. Sedlock, Wapping, Conn., Charles F. Paquette, Springfield, Mass., and Henry J. Selfors, Glastonbury, Conn., assignors to United Aircraft Corporation, East Hartford, Conn., a corporation of Delaware
Filed Sept. 22, 1966, Ser. No. 581,346
Int. Cl. H02k 9/02
U.S. Cl. 310—59                        8 Claims

ABSTRACT OF THE DISCLOSURE

Self-cooled, rotating electrical machinery having radial cooling passages in the stator and rotor, the cooling passages being defined by the design and mode of stacking of the laminations which comprise the field core, field poles and armature core of the machines is disclosed. Coolant flow is established by employing the rotor as a centrifugal pump during high speed rotation, coolant flow being along the axis of the machine and outwardly through the radial passages in the stator and rotor.

---

The present invention relates to the cooling of rotating electrical machinery. More particularly, this invention is directed to the cooling of high speed, direct current machinery. Accordingly, the general objects of this invention are to provide new and improved methods and apparatus of such character.

Conventional prior art electrical machinery, and particularly direct current generators, are not compatible in either weight or size to gas turbine engines. Accordingly, full exploitation of the gas turbine engine, for example, in vericular applications, has been hampered by the large size of the electrical generators that must be coupled to the engine to supply the required electrical power. Restated, the conventional prior art electrical generator is considerably heavier and larger in size than the gas turbine engine that would be employed to, for example, drive a self-powered railway unit corresponding to the present diesel-electric equipment. Thus, many possible applications for gas turbine-electric generator power packages, particularly direct current applications, do not receive due consideration since the large size and weight of the generator often prohibits utilization of a power package of this type. By bringing down the size of the generator so that it is as small as or smaller than the gas turbine driving it, a power package could be offered which would be attractive for use on vehicles where axel loadings and size are important.

Since the gas turbine is inherently a high speed device and the conventional electrical generator a low speed device, a coupling problem also exists. In the prior art, either the speed of the gas turbine was reduced by gearing, thereby adding additional weight and cost, or a free tubine type engine was utilized. The addition of the free turbine driven by the gas generator adds additional cost and, in order to achieve a low speed free turbine, it is necessary that the free turbine assembly be quite massive. Accordingly, the utility of the gas turbine engine and the attractiveness of power packages wherein such engines drive electrical generators could be greatly increased by development of a high speed generator that could be directly coupled to the turbine shaft thus eliminating the need for speed reducers or free turbines.

As indicated by the foregoing, it is a present desire to decrease the size and weight of electrical machines, and particularly direct current generators, while simultaneously increasing the rotational speed of such devices. Attempts at increasing speed while simultaneously decreasing size and weight inherently precipitate a cooling problem. That is, as speed is increased, losses due to friction also increase and thus there is more heat generated within the electrical machine. However, as size and weight are decreased, there is less metal to absorb and conduct heat away from materials such as insulation which are susceptible to thermal damage due to heat generated within the machine. In short, smaller size and weight decreases the heat sink capability of the machine while increased speed dictates that increased heat sink capability be provided.

The present invention enables a decrease in the size and weight and an increase in the rotational speed of electrical machines by providing novel and highly efficient means for cooling such machines.

It is therefor an object of the present invention to cool electrical machinery.

It is another object of the present invention to cool a rotating electrical machine in a more efficient manner than previously possible.

It is still another object of the present invention to provide an entirely self-contained cooling system for rotating electrical machinery.

It is also an object of the present invention to provide for increased cooling of electrical machines thereby permitting an increase in the rotational speed of such machines.

It is a further object of the present invention to permit a decrease in the size of electrical machines by increasing the cooling efficiency of such machines.

It is yet another object of the present invention to provide a direct current generator of high speed and low weight through increasing the cooling efficiency of such machines.

These and other objects of the present invention are accomplished by utilizing the center portion adjacent the axis of rotation of the machine, which portion formerly contained dead space, as a duct for cooling air. The cooling air from this center duct is pumped out through a plurality of radially oriented air passages in both the rotor and stator of the machine to accomplish the desired cooling. The air passages in both the rotor and stator are defined by novel arrangements of the laminations which comprise the field core, field poles and armature core. In a preferred embodiment, coolant flow is established by employing the rotor as a centrifugal pump which, due to the pressure differentials established thereacross during high speed rotation, causes radial flow of the coolant.

This invention may be better understood and its various advantages will be clearly seen by those skilled in the art through reference to the accompanying drawing wherein like reference numerals refer to like elements in the various figures and in which.

While not limited thereto in its utility, the present invention is particularly well suited for incorporation in direct current generators of the "inside-out" type. An "inside-out" machine is one wherein the rotor rotates about rather than within the stator assembly. The field poles are mounted on the stator and, displaced radially outward across an air gap there from, the armature coils are arranged on the rotor.

Figure 1:
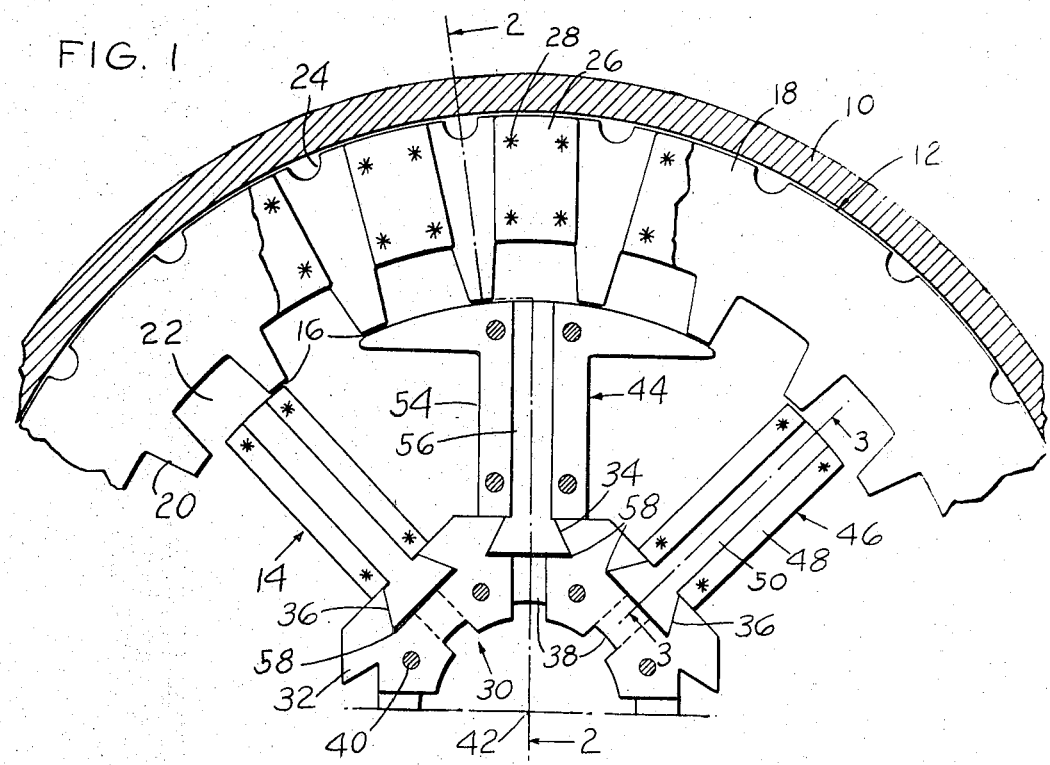
FIGURE 1 is a partial, cross-sectional, front view of an electrical machine fabricated in accordance with the present invention.

Referring now to FIGURE 1, an "inside-out" generator is depicted. This generator comprises an outer case 10, a rotor indicated generally at 12 and a stator assembly indicated generally at 14. Rotor 12 functions as the armature of the machine and is separated from the field poles mounted on the stator by a small air gap 16.

Figure 2:
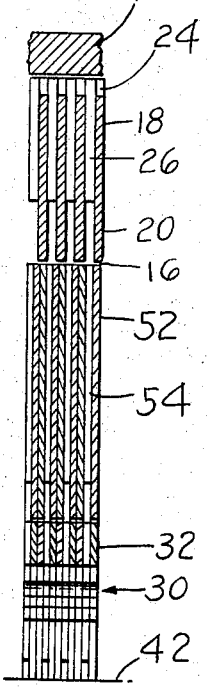
FIGURE 2 is a partial, cross-sectional, side view of the embodiment of FIGURE 1 taken along line 2—2 of FIGURE 1.

Rotor 12 comprises, as may best be seen from the consideration of FIGURES 1 and 2 together, a plurality of laminations and spacers. The armature (rotor) laminations 18 are hoop shaped and have extending inwardly, about their inner diameter, a plurality of equally spaced armature teeth 20. The armature conductors, not shown, are nested in the longitudinal slots 22 defined by the armature teeth 20. The armature laminations are also provided, about their outer diameter, with a plurality of grooves 24 which define longitudinal air passages between the rotor 12 and outer case 10.

As noted above, the laminated armature assembly is also comprised of spacers 26 which are spot welded to the laminations 18 as shown at 28. The spacers 26 are as wide as slots 22 and are attached to the armature laminations 18 at the points which will form the bases of each of longitudinal slots 22. Accordingly, each pair of spacers, in cooperation with the laminations to either side thereof, define a radial air passage between the laminations. Each armature air passage communicates between air gap 16 and one of grooves 24, as may be clearly seen from FIGURE 2, via the armature teeth. Thus, by stacking the laminations and spacers up to the required length, air passages next to the slots 22 that hold the armature conductors are formed. Through proper design of the geometry of these passages for cooling air, the proper film coefficient of heat transfer can be obtained. In a typical embodiment, as shown in FIGURE 2, the armature laminations 18 are separated by spacers 26 which are of the same thickness as a single armature lamination. Obviously, the shape and thickness of the spacers may be varied to obtain the proper heat transfer characteristics. As previously noted and seen from FIGURE 2, the ends of the armature teeth are, by virtue of the spacers, slotted and extend into the air gap 16. Accordingly, when the rotor 12 rotates at a high speed, the armature acts as a radial fan or centrifugal pump and a pressure differential is established between air gap 16 and grooves 24, the higher pressure being at the air gap. Thus, the rotating armature creates an ejector action to establish coolant flow.

The "inside-out" configuration of the embodiment being described also gives the machine a greater speed capability. In the prior art, the limiting factor that determined the maximum speed of a rotor was the problem of retaining the armature conductors in the slots defined by the armature teeth. The armature conductors in prior art machines were typically about the outer diameter of the rotor and were retained in place by insulating wedges which transmitted the retention load (generated by centrifugal force) to the teeth and thence down into the body of the armature. Obviously, the sheer strength of the insulating wedge could not be exceeded and the strength of the usual insulating materials was lower than that of metal. Further, the tensile strength of the armature teeth could not be exceeded. Thus, if the individual teeth were widened for a given diameter armature, either the slot width or the number of slots had to be decreased. These solutions decreased the number of conductors or required the use of conductors of small diameter and thus small current carrying capability. Similarily, deepening the armature slots beyond a certain limit causes the coefficient of mutual induction of the slot to rise sharply. This in turn causes the sparking voltage to increase and deters commutation. In the "inside out" machine, as shown in FIGURE 1, all of these problems are eliminated. Referring again to FIGURE 1, since the armature conductors are disposed in slots 22 which are about the inner diameter of the rotor, the armature laminations function as hoops to keep the conductors in place. Thus, there is no centrifugal loading on the teeth and the entire load, due to centrifugal force on the conductors and the mass of the rotor, is absorbed by the body of the armature which acts as a thick-walled cylinder. Also, since in the "inside-out" design the tooth width is limited only by the amount of metal needed to avoid over-saturation, the maximum number of copper conductors can be placed around a given diameter. It should also be observed that, in the conventional design, the air gap between the stator and rotor must be designed to accommodate any thermal growth of the armature due to temporary overload or any centrifugal induced growth resulting from over speed. In the "inside-out" design a further advantage is realized due to the fact that the operating air gap can be made as small as manufacturing tolerances of the laminations and bearing radial clearances will allow. Any centrifugal or thermal growth that occurs forces the armature away from the field poles and eliminates the possibility of rubbing. Since the length of the air gap is inversely proportional to the number of amphere turns required to produce the desired flux density, a small air gap requires a smaller field coil to produce the required flux and thus the "inside-out" design greatly aids the reduction in overall size of the D.C. generator.

Starting from the inside-out, the stator 14 comprises a field core assembly indicated generally at 30. The field core assembly 30 is comprised of a plurality of laminations, each of which is made up of four identical stampings 32. These stampings define, about the outer diameter of the field core assembly 30, a plurality of dove tail slots 34 and 36 which respectively receive and support the main field poles and interpoles. The field core assembly 30 is assembled by positioning four of stampings 32 so as to define a circular lamination, with air passages 38 between each of stampings 32, and then stacking the laminations one upon another while alternating the angular position of each lamination by 45° so as to distribute the air passages evenly along the assembly. Restated, as the field core assembly is built up to the desired length, air passages 38 communicating with dove tail slots 34 for the field poles and the dove tail slots 36 for the interpoles are respectively formed in alternate laminations. After assembly of the laminations, rivets 40 may be passed lengthwise through the assembly and/or longitudinal welds running the length of the assembly are made at several points along its outer surface to retain the stampings in position.

The field core assembly 30 is mounted on a perforated inner support and air supply shaft, not shown. In the manner to be described below, cooling air will be drawn in through this inner support about the axis of rotation 42 of the machine and will flow radially outward through cooling air passages 38 which communicate with the bottom of the eight dove tail slots 34–36. The thickness of each of stampings 32 determines the thickness of the air passages 38 and this thickness may be varied as desired or necessary to achieve the proper cooling.

Figure 3:
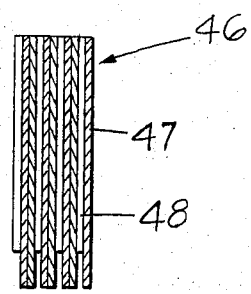
FIGURE 3 is a partial, cross-sectional side view of the embodiment of FIGURE 1 taken along line 3—3 of FIGURE 1.

A main field pole is indicated generally at 44 and two interpoles at 46. The poles are of laminated construction and formed by alternating stampings and spacers. This provides a plurality of cooling passages within each pole. Stampings for both the main pole and the interpole are respectively of the same shape as poles 44 and 46 and have feet thereon which respectively engage dove tail slots 34 and 36. In the case of the interpoles, two spacers 48 of rectangular shape are employed for each pair of stampings 47 so as to define an air passage 50 in the center of the pole, as shown by FIGURE 3, after each second stamping. The spacers 48 are attached to the stampings 47 by spot welding as shown and a plurality of weld beads are run down the sides of the poles after the stacking of the stampings and spacers has been completed.

Like the interpoles, the main poles 44 are comprised of stampings 52 and spacers 54 which are spot welded thereto. The arrangement of the stampings and spacers is such that an air passage 56 is defined after every stamping 52. Stampings 52, of course, have feet thereon which engage dove tail slots 34 and spacers 54 are, on their outer end, commensurate in shape with the poles. In the case of both the main poles and interpoles, in the interest of simplicity, the windings comprising the coils have not been shown.

In operation, as noted above, the rotor acts as a centrifugal pump and creates a pressure differential across the armature core. This pressure differential causes air to be pumped from the apertured center support, through passages 38 in the field core assembly 30, through air passages 50 and 56 of the interpoles and main poles respectively, across the air gap 16, and through the armature passages defined by spacers 26 to longitudinal grooves 24. The air thus drawn from about the axis of rotation of the machine passes radially outward through a plurality of slots in the field core, the pole pieces and the armature and travels axially along the outer diameter of rotor to the ends of the machine where it is expelled. This pumped-air flow is sufficient to completely cool the machine over the entire range of operating conditions. In one reduction to practice, the weight of a direct current generator employing the teachings of the present invention was reduced over commercially available equipment by a factor of 10 and the size was reduced by a factor of 9. The generator was then operated at 15,000 r.p.m. and the cooling flow held the maximum insulation temperature to 300° F. while metal temperature was maintained at 230° F. Cooling flow established by following the teachings of the present invention eliminates the need for the cooling fan found at the end of conventional generators. By designing the rotor with cooling slots between each lamination, maximum heat transfer heat coefficient and wetted area with the smallest pressure drop is achieved and virtually all generated heat is removed from the rotor by forced air convection. Thus, the unique construction of the present invention allows a large heat transfer area to be exposed to the cooling air in the region where maximum heat generation occurs from $I^2R$ heating of the armature conductors and from hysteresis losses in the armature laminations. It should also be noted that the main pole and interpole assemblies do not bottom in the dove tail slots provided therefor in the field core assembly 30. Accordingly, plenum chambers 58 are formed beneath the pole pieces which chambers tend to insure equal air flow through passages 50 and 56 in the interpoles and main poles respectively.

While a preferred embodiment has been shown and described, various modifications and substitutions may be made without departing from the spirit and scope of this invention. Accordingly, it is to be understood that this invetnion has been described by way of illustration and not limitation.

What is claimed is:

1. A self-cooled electrical machine comprising:
  an outer case;
  stator means positioned within said case, said stator means being defined by a plurality of identical stampings, a predetermined number of said stampings defining a lamination, a plurality of said laminations being stacked to form a field core, the angular position of predetermined laminations being varied with respect to the remaining laminations, spaces remaining between the stampings comprising each lamination, said spaces and the next laminations of different angular position to either side thereof defining passages for cooling fluid extending radially through said field core;
  a plurality of pole piece retaining slots disposed about the diameter of said field core, said slots being defined in part by adjacent stampings on each lamination the bases of said slots communicating with said radial passages;
  a plurality of pole pieces mounted on said stator means, said pole pieces being retained in said field core pole piece retaining slots; and
  rotor means supported within said case and coaxial with said stator means, said rotor means being separated from said pole pieces by an air gap, said rotor means having a plurality of passages extending radially therethrough, said passages being spaced so as to discharge cooling fluid along the length of and about the outer surface of said rotor means, cooling fluid flowing radially through said machine between the inside of said outer case and the region about the axis of rotation of the machine via said passages in said rotor means and stator field core.

2. The apparatus of claim 1 wherein said pole pieces each comprise:
  a plurality of stampings commensurate in shape with the desired pole piece shape; and
  pole piece spacer means, said stampings and spacer means being stacked to provide laminated pole pieces with passages therethrough for the flow of cooling fluid.

3. The apparatus of claim 2 wherein said pole piece spacer means each comprise:
  a pair of pole piece inserts for each pole piece, said pairs of inserts being affixed to pole piece stampings so as to define a slot therebetween, said slots and adjacent stampings defining passages communicating between the face and base of the pole pieces.

4. The apparatus of claim 12 wherein said pole pieces are mounted in said field core slots in such a manner that a space remains between the base of the pole pieces and the bottom of said slots, said space defining a chamber whereby cooling fluid passing through said core passages is evenly distributed to said pole piece passages.

5. A self-cooled electrical machine comprising:
  an outer case;
  stator means positioned within said case, said stator means having a plurality of passages extending radially therethrough, said stator means comprising:
    a field core coaxial with the axis of rotation of said machine, said field core having a plurality of pole pieces retaining slots disposed about its outer diameter, said radial passages communicating with said retaining slots; and
    a plurality of pole pieces mounted in said slots and extending radially outward from said field core, said pole pieces having passages extending therethrough; and rotor means supported within said case outwardly of and coaxial with said stator means, said rotor means comprising:
      a plurality of substantially hoop-shaped laminations, each of said laminations having a plurality of inwardly extending teeth, said teeth extending toward said pole pieces and cooperating therewith to define an air gap therebetween, said teeth functioning as vanes during rotation of said rotor whereby said rotor acts as a centrifugal pump to establish a flow of cooling fluid radially outwardly through the machine, said teeth being aligned when said laminations are stacked and thus defining a plurality of slots for armature conductors;
      rotor spacer means positioned between some of said laminations, said laminations and said spacer means being stacked to form a rotor coaxial with the axis of said machine, said rotor spacer means cooperating with said laminations to define radial passages for cooling fluid through said rotor, said spacer means comprising inserts affixed to desired laminations at the base of the armature conductor slots defined by said aligned teeth, said rotor inserts each having a width approximately equal to the width of the base of the slots, said rotor inserts and laminations cooperating to define radial passages between said teeth.

6. The apparatus of claim 5 wherein said field core comprises:

a plurality of identical stampings, a predetermined number of said stampings defining a lamination, a plurality of said laminations being stacked to form the field core, the angular position of predetermined laminations being varied with respect to the remaining laminations, spaces remaining between the stampings comprising each lamination, said spaces and the next laminations of different angular position to either side thereof defining passages for cooling fluid extending radially through said field core.

7. The apparatus of claim 6 wherein said pole pieces each comprise:
   a plurality of stampings commensurate in shape with the desired pole piece shape; and
   pole piece spacer means, said stampings and spacer means being stacked to provide laminated pole pieces with passages therethrough for the flow of cooling fluid.

8. The apparatus of claim 7 wherein said pole piece spacer means each comprise:
   a pair of pole piece inserts for each pole piece, said pairs of inserts being affixed to pole piece stampings so as to define a slot therebetween, said slots and adjacent stampings defining passages communicating between the face and base of the pole pieces.

References Cited
UNITED STATES PATENTS

| | | | |
|---|---|---|---|
| 714,881 | 12/1902 | Emmet | 310—65 |
| 895,894 | 8/1908 | Rice | 310—60 |
| 1,301,844 | 4/1919 | Hellmund et al. | 310—59 |
| 2,163,528 | 6/1939 | Lauck | 310—67 |
| 3,009,072 | 11/1961 | Mossay | 310—64 X |
| 3,123,747 | 3/1964 | Glass | 310—65 X |
| 3,171,996 | 3/1965 | Alger et al. | 310—64 X |
| 3,188,833 | 6/1965 | Robinson | 310—61 X |

ORIS L. RADER, Primary Examiner

EZRA SUTTON, Assistant Examiner

U.S. Cl. X.R.

310—61, 65

PO-1050
(5/69)

UNITED STATES PATENT OFFICE
CERTIFICATE OF CORRECTION

Patent No. 3,471,727         Dated   October 7, 1969

Inventor(s) Edward J. Sedlock et al

It is certified that error appears in the above-identified patent and that said Letters Patent are hereby corrected as shown below:

Amend Claim 4 as follows:
Line 1 (column 6, line 24), change "12" to --3--
Amend Claim 5 as follows:
At column 6, line 43, after "and" start a new paragraph at the lefthand margin with "rotor means...."

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents